United States Patent
Di Chiro et al.

(10) Patent No.: US 8,654,865 B2
(45) Date of Patent: Feb. 18, 2014

(54) DEVICE AND SYSTEM FOR PRESERVING, TRANSMITTING AND RECEIVING HDMI OR A/V SIGNALS ALONG A POWER-LINE COMMUNICATION NETWORK

(75) Inventors: Anthony Di Chiro, Chatsworth, CA (US); Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 140 days.

(21) Appl. No.: 12/793,419

(22) Filed: Jun. 3, 2010

(65) Prior Publication Data
US 2010/0309992 A1 Dec. 9, 2010

Related U.S. Application Data

(60) Provisional application No. 61/183,828, filed on Jun. 3, 2009.

(51) Int. Cl.
*H04B 3/00* (2006.01)

(52) U.S. Cl.
USPC ............................ 375/257; 375/260; 375/288

(58) Field of Classification Search
USPC .......................... 375/256, 257, 259, 260, 288
See application file for complete search history.

(56) References Cited

U.S. PATENT DOCUMENTS

| | | | |
|---|---|---|---|
| 8,081,705 B2 * | 12/2011 | Kirkpatrick | 375/288 |
| 2002/0060617 A1 * | 5/2002 | Walbeck et al. | 333/181 |
| 2007/0087722 A1 * | 4/2007 | Ichihara | 455/343.1 |
| 2008/0130640 A1 * | 6/2008 | Hurwitz et al. | 370/389 |
| 2009/0247006 A1 * | 10/2009 | Thompson | 439/527 |

* cited by examiner

*Primary Examiner* — Qutbuddin Ghulamali
(74) *Attorney, Agent, or Firm* — Sentinel IP; John Nielsen

(57) ABSTRACT

A combination noise-filter, surge protections circuit and HDMI communication device. HDMI specific noise filters, surge protection circuits, PLC modem and encoding/decoding apparatus are connect to, or integrated into, power outlets in a home or other wired building enabling a high bandwidth powerline communication network.

4 Claims, 3 Drawing Sheets

DEVICE AND SYSTEM FOR PRESERVING, TRANSMITTING AND RECEIVING HDMI OR A/V SIGNALS ALONG A POWER-LINE COMMUNICATION NETWORK

CROSS-REFERENCE TO RELATED DOCUMENTS

This non-provisional application is based on and claims priority to U.S. Provisional Application Ser. No. 61/183,828 filed Jun. 3, 2009.

BACKGROUND OF THE INVENTION

An existing infrastructure of transmission lines for transmitting low frequency analog or digital signals can, under the right circumstances, comprise a means for transmitting simultaneous high frequency digital signals so long as there are also means for preserving the integrity of the high frequency signal and preventing degradation due to noise or other interference.

For instance, power-lines provide an efficient infrastructure for communications systems. A great advantage to the use of power-lines for communication transmittal is that they provide inherent connection between points, and eliminate the need for separate cabling systems. This advantage has been widely put to use in the context of Ethernet networking. Another possible use of power-line communications systems involves the transmittal of encoded High Definition Multimedia Interface or other audio/video signals along power-lines. In such a system, HDMI or A/V components in one room can be connected to various televisions or monitors throughout a home or office by means of the in-wall power-line system. However, in order to transmit an effective signal along power-lines, it is necessary to provide means for noise filtering and surge protection to both preserve signal integrity and protect components from damage attributable to voltage variations.

Ordinary noise filters are not adequate for this task because they are not designed to differentiate between encoded HDMI or other A/V signals (which need to be preserved and transmitted along the power-line) and high-frequency noise (which needs to be filtered out). In addition, any power-line communication device should have internal surge protection in order to eliminate the risk of damage to downstream electronics associated with over-voltage events. Consequently, in order to take full advantage of a power-line communication system transmitting encoded HDMI or other A/V signals, there is a need for an integrated device that provides effective noise-filtering, preserves the integrity of transmitted signals and also protects downstream components against voltage anomalies.

DESCRIPTION OF THE INVENTION

In its preferred embodiment, the present inventive concept includes a combination noise-filter, surge-protection circuit, and HDMI communication device. Preferred embodiments of HDMI communication devices include HDMI transmitters, HDMI receivers and HDMI encoder/transmitters for receiving assorted A/V signals, converting to HDMI and transmitting as such. In various preferred embodiments, an HDMI transmitter communication device may comprise a power-line communications modem or functional equivalent coupled to an HDMI encoder, an A/V encoder and digital processor with means for coupling to an HDMI source as well as infra-red blasters for receiving and transmitting IR signals. Similarly, a preferred embodiment for an HDMI receiver may comprise a power-line communications modem or functional equivalent, an HDMI decoder, A/V decoder and digital processor as well as means for coupling to an HDMI port on a media monitor as well as IR blasters for receiving and transmitting IR signals. Yet another preferred embodiment integrates HDMI and other A/V components by encoding and transmitting various signal types as HDMI along a transmission or power-line, and can include a PLC modem, an HDMI encoder, an A/V encoder and a digital processor, as well as means for receiving various A/V signals, to be encoded and transmitted as HDMI signals.

In its preferred embodiments, the inventive concept includes devices that transmit or receive encoded HDMI signals over transmission lines and simultaneously prevent noise or other signal degrading occurrences from entering the line and interfering with signal integrity. Preferred embodiments further present the correct impedance to the power-line devices to protect and to transmit the power-line communication of encoded HDMI signals. Noise filters included in all preferred embodiments are optimized for the desired performance and protection of the power-line communication with encoded HDMI signal.

In one preferred embodiment, the HDMI-specific noise-filters, surge protection circuits, PLC modem and encoding/decoding apparatus can be integrated into original power sockets in new construction and can be retrofitted in existing homes and buildings. An optimized system of such devices would include a power-line communications network where all the power receptacles in a home or building are equipped with a preferred embodiment comprising surge-protection and HDMI-specific filter technology as disclosed herein. As an example of such an optimized system for transmitting HDMI signals, bandwidth over a power-line communication network could be improved by 100%, with plausible consequent performance parameters enabling simultaneous streaming of as many as five high-definition movies over the network.

Figure 1:
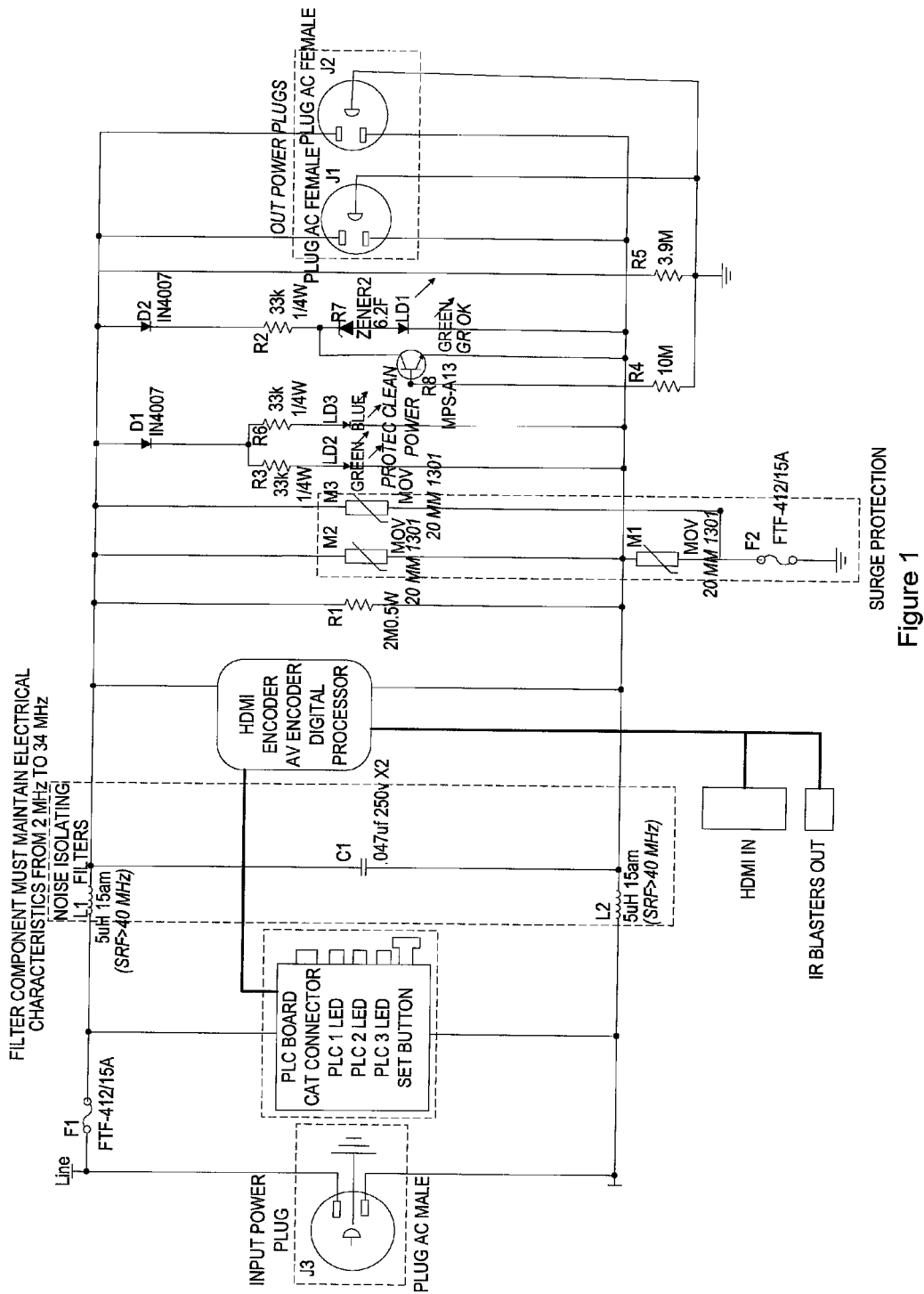
FIG. 1 is a schematic diagram of an encoded HDMI signal transmitter and encoded IR signal receiver circuit associated with a preferred alternative embodiment of the invention.
Figure 2:
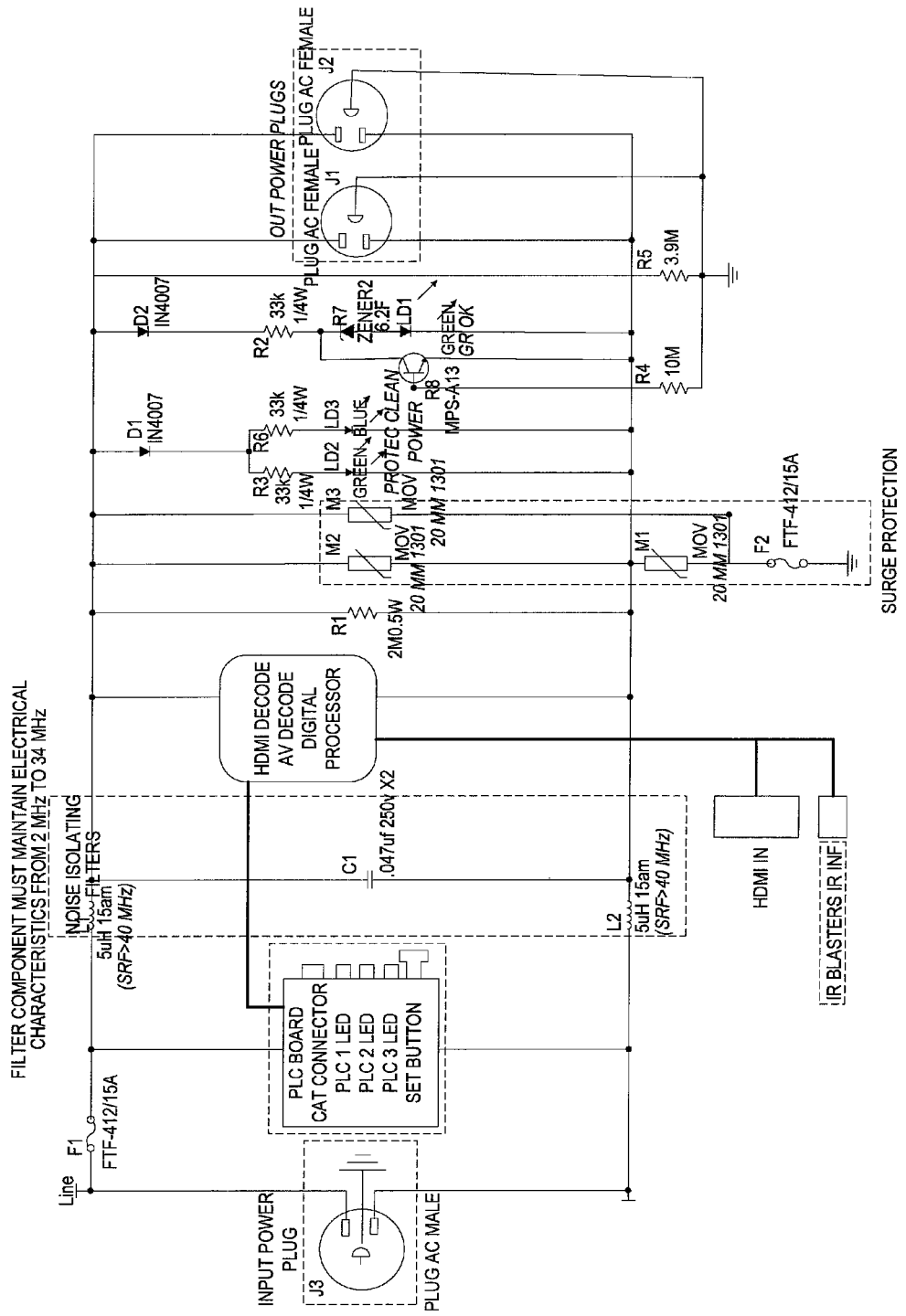
FIG. 2 is a schematic diagram of an encoded IR signal transmitter and encoded HDMI signal receiver circuit associated with a preferred alternative embodiment of the invention.
Figure 3:
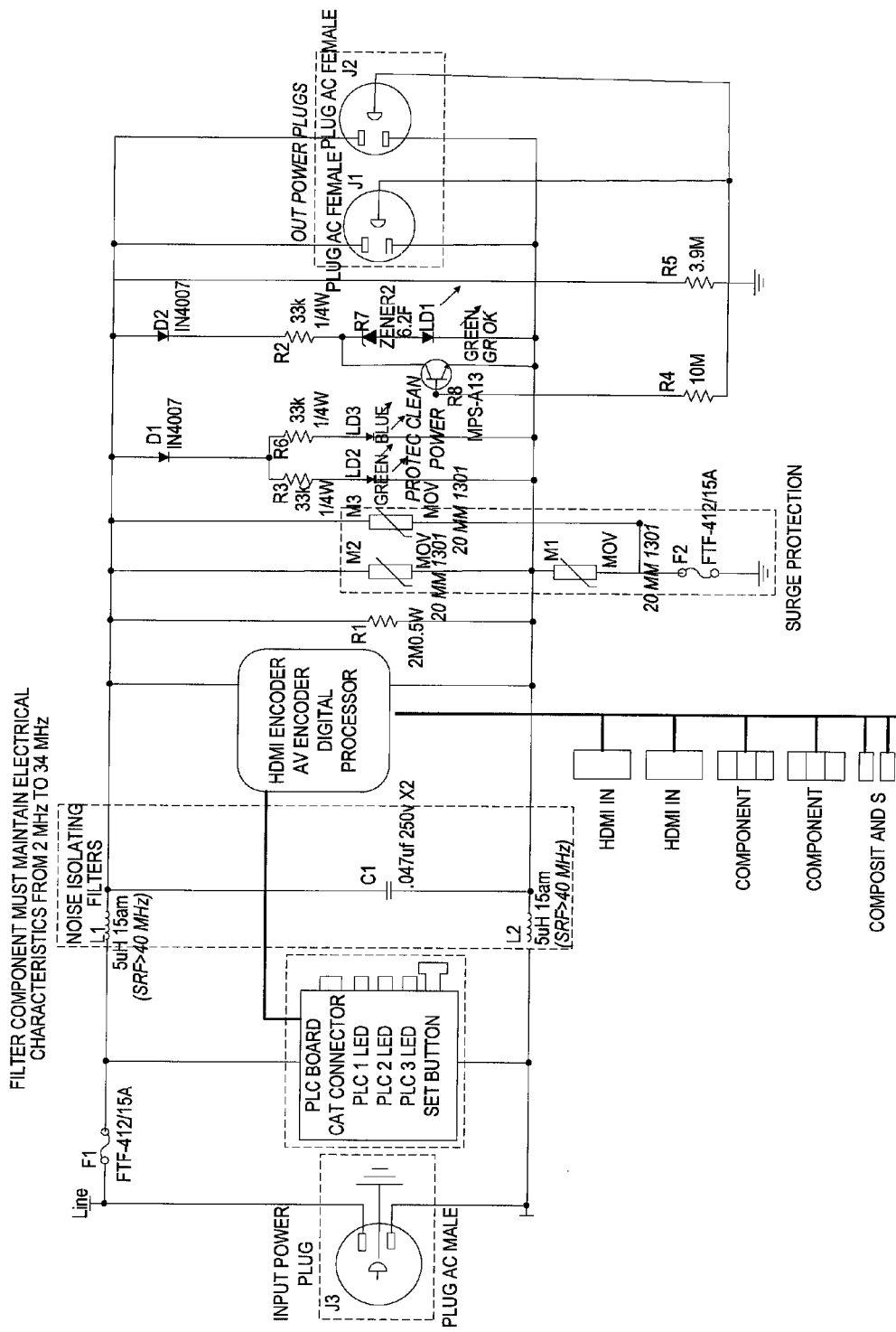
FIG. 3 is a schematic diagram of an encoded HDMI signal transmitter and encoded IR signal receiver circuit associated with a preferred alternative embodiment of the invention.

We claim:

1. A device for transmitting and receiving audio/visual signals over a power-line communication network comprising:
   a. an input interface for receiving a High Definition Multimedia Interface (HDMI), signal;
   b. an output interface for transmitting an infrared (IR) signal;
   c. a power-line communication modem for transmitting a first digital signal over a power-line, and for receiving a second digital signal over the power-line;
   d. a HDMI encoder/digital processor connected to the input interface, the output interface, and the power-line communications modem, for converting the HDMI signal to the first digital signal, and for converting the second digital signal to the IR signal;

e. a noise filter circuit connected to the HDMI encoder/digital processor and to the power-line communication modem for suppressing signals outside a range of 2 MHz to 34 MHz;

f. a surge protection circuit connected to the HDMI encoder/digital processor and to the power-line communication modem for protecting the HDMI encoder/digital processor and the power-line communication modem from power surges.

2. A device for transmitting and receiving audio/visual signals over a power-line communication network comprising:

a. an input interface for receiving an infrared (IR) signal;

b. an output interface for transmitting a High Definition Multimedia Interface (HDMI) signal;

c. a power-line communication modem for receiving a first digital signal over a power-line, and for transmitting a second digital signal over the power-line;

d. a HDMI decoder/digital processor connected to the output interface, the input interface, and the power-line communication modem, for converting the first digital signal to the HDMI signal, and for converting the IR signal to the second digital signal;

e. a noise filter circuit connected to the HDMI decoder/digital processor and to the power-line communication modem for suppressing signals outside a range of 2 MHz to 34 MHz;

f. a surge protection circuit connected to the HDMI decoder/digital processor and to the power-line communication modem for protecting the HDMI encoder/digital processor and the power-line communication modem from power surges.

3. A system for transmitting and receiving audio/visual equipment signals over a power-line communication network comprising:

a. a signal transmitting device comprising:
  i. a High Definition Multimedia Interface (HDMI) input interface for receiving an input HDMI signal;
  ii. an infrared (IR) output interface for transmitting an output IR signal;
  iii. a power-line communication modem for transmitting a first encoded signal over a power-line and for receiving a second encoded signal over the power-line;
  iv. a HDMI encoder/digital processor connected to the HDMI input interface, the IR output interface, and the power-line communication modem of the signal transmitting device, for encoding the input HDMI signal to the first encoded signal and for decoding the second encoded signal to the output IR signal;

b. a signal receiving device comprising:
  i. a HDMI output interface for transmitting an output HDMI signal;
  ii. an IR input interface for receiving an input IR signal;
  iii. a power-line communication modem for transmitting the first encoded signal over the power-line and for receiving the second encoded signal over the power-line;
  iv. a HDMI decoder/digital processor connected to the HDMI output interface, the IR input interface, and the power-line communication modem of the signal receiving device, for decoding the first encoded signal to the output HDMI signal and for encoding the input IR signal to the second encoded signal.

4. The system of claim 3 wherein a. the signal transmitting device further comprises:
  i. a noise filter circuit connected to the HDMI encoder/digital processor and to the power-line communication modem of the signal transmitting device, the noise filtration circuit for suppressing signals outside a range of 2 MHz to 34 MHz;
  ii. a surge protection circuit connected to the HDMI encoder/digital processor and to the power-line communication modem of the signal transmitting device, the surge protection circuit for protecting the HDMI encoder/digital processor and the power-line communication modem of the signal transmitting device from power surges; and b. the signal receiving device further comprises:
  i. a noise filter circuit connected to the HDMI decoder/digital processor and to the power line communication modem of the signal receiving device, the noise filtration, circuit for suppressing signals outside a range of 2 MHz to 34 MHz;
  ii. a surge protection circuit connected to the HDMI decoder/digital processor and to the power-line communication modem of the signal receiving device, the surge protection circuit for protecting the HDMI decoder/digital processor and the power-line communication modem of the signal receiving device from power surges.

* * * * *